(12) United States Patent
Nagasawa

(10) Patent No.: US 8,086,561 B2
(45) Date of Patent: Dec. 27, 2011

(54) DOCUMENT SEARCHING SYSTEM AND DOCUMENT SEARCHING METHOD

(75) Inventor: Daisuke Nagasawa, Bangalore (IN)

(73) Assignee: Kabushiki Kaisha Toshiba, Tokyo (JP)

( * ) Notice: Subject to any disclaimer, the term of this patent is extended or adjusted under 35 U.S.C. 154(b) by 376 days.

(21) Appl. No.: 12/032,880

(22) Filed: Feb. 18, 2008

(65) Prior Publication Data

US 2008/0208843 A1 Aug. 28, 2008

(30) Foreign Application Priority Data

Feb. 27, 2007 (JP) ................................ 2007-047860

(51) Int. Cl.
*G06F 7/00* (2006.01)
*G06F 12/00* (2006.01)
*G06F 13/00* (2006.01)
*H04N 7/173* (2011.01)

(52) U.S. Cl. ........ 707/602; 707/758; 707/770; 707/812; 711/100; 711/111; 725/115

(58) Field of Classification Search ........................ None
See application file for complete search history.

(56) References Cited

U.S. PATENT DOCUMENTS

2005/0144153 A1 * 6/2005 Hattori et al. ..................... 707/1
2007/0185845 A1 * 8/2007 Nonomura ........................ 707/3

FOREIGN PATENT DOCUMENTS

| JP | 2001-109758 | 4/2001 |
| JP | 2004-310249 | 11/2004 |
| JP | 2005-190163 | 7/2005 |

* cited by examiner

*Primary Examiner* — Pierre Vital
*Assistant Examiner* — Berhanu Mitiku
(74) *Attorney, Agent, or Firm* — Turocy & Watson, LLP

(57) ABSTRACT

In a document searching system, a first storing apparatus, a second storing apparatus, and a document managing apparatus are connected to one another. The document managing apparatus stores structure information that shows a hierarchical structure regarding hierarchy positional relationships among the elements in the structured documents stored in the first and the second storing apparatuses. The document managing apparatus extracts an identical element that is a predetermined element in the structured documents stored in the second storing apparatus that matches the element in the structured documents stored in the first storing apparatus. The first storing apparatus stores the structured documents and conducts a search in the stored structured documents for one of the structured documents that contains the received identical element. The second storing apparatus conducts a search for one of the structured documents containing the identical element that matches the received text information.

10 Claims, 11 Drawing Sheets

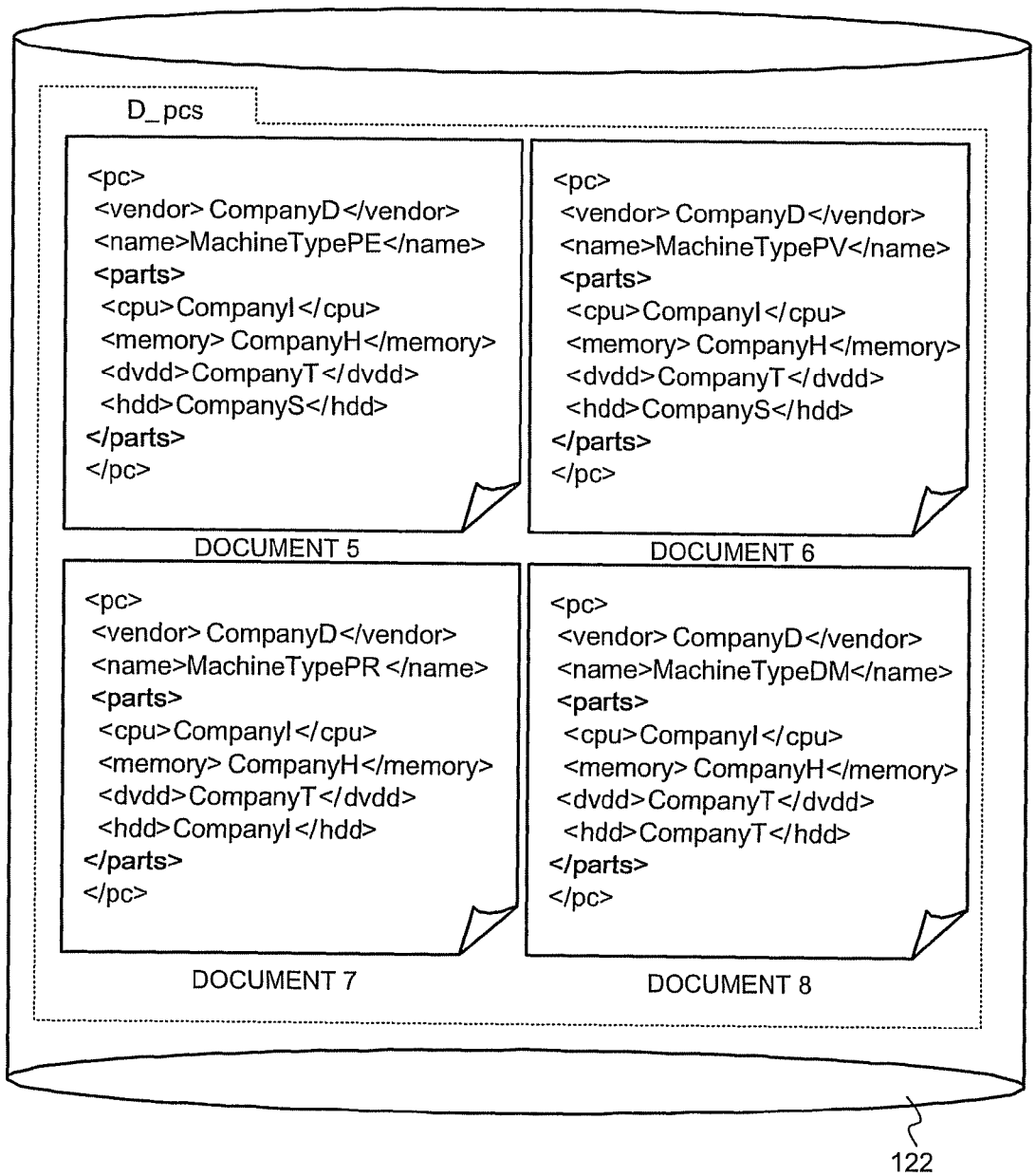

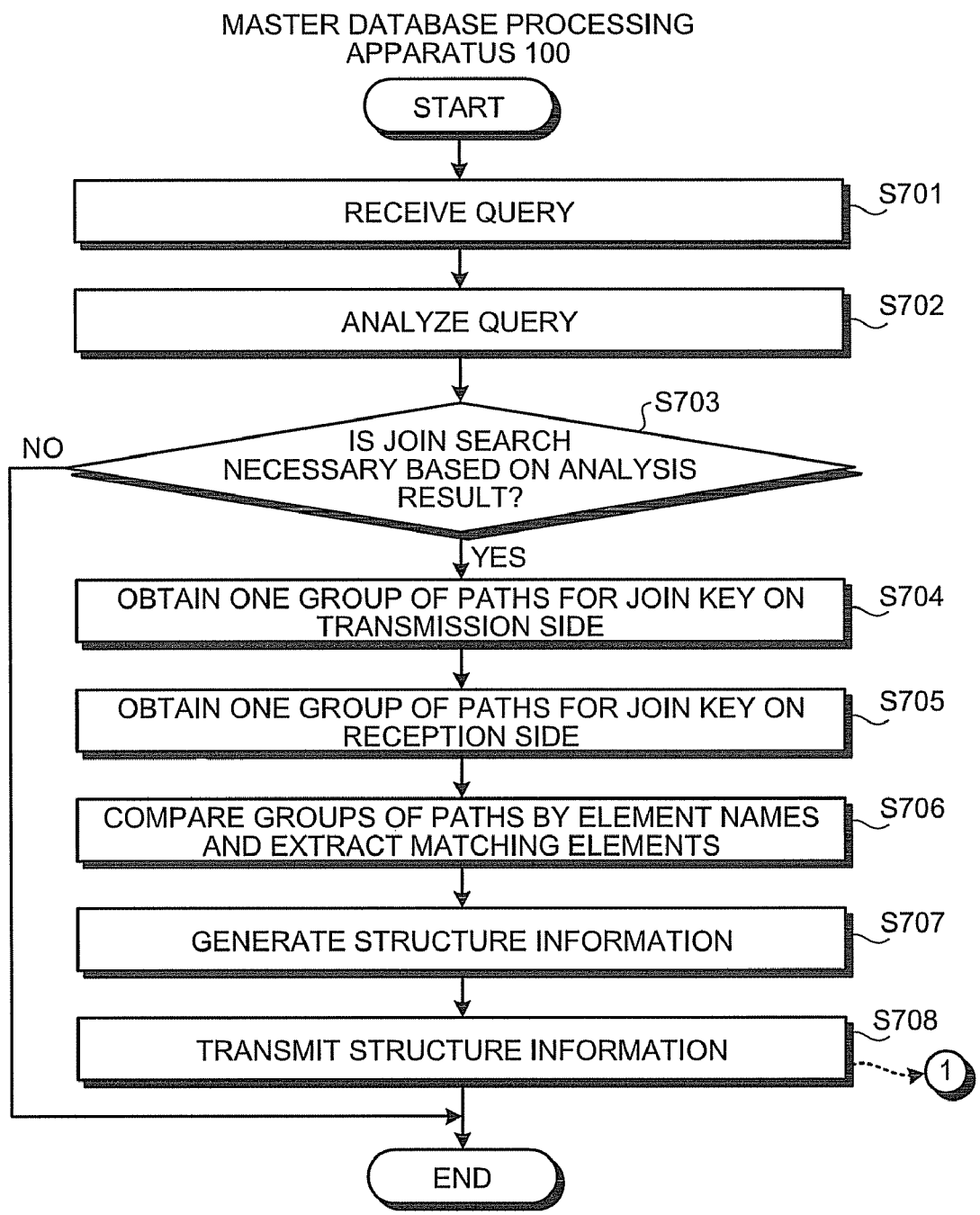

FIG.7B
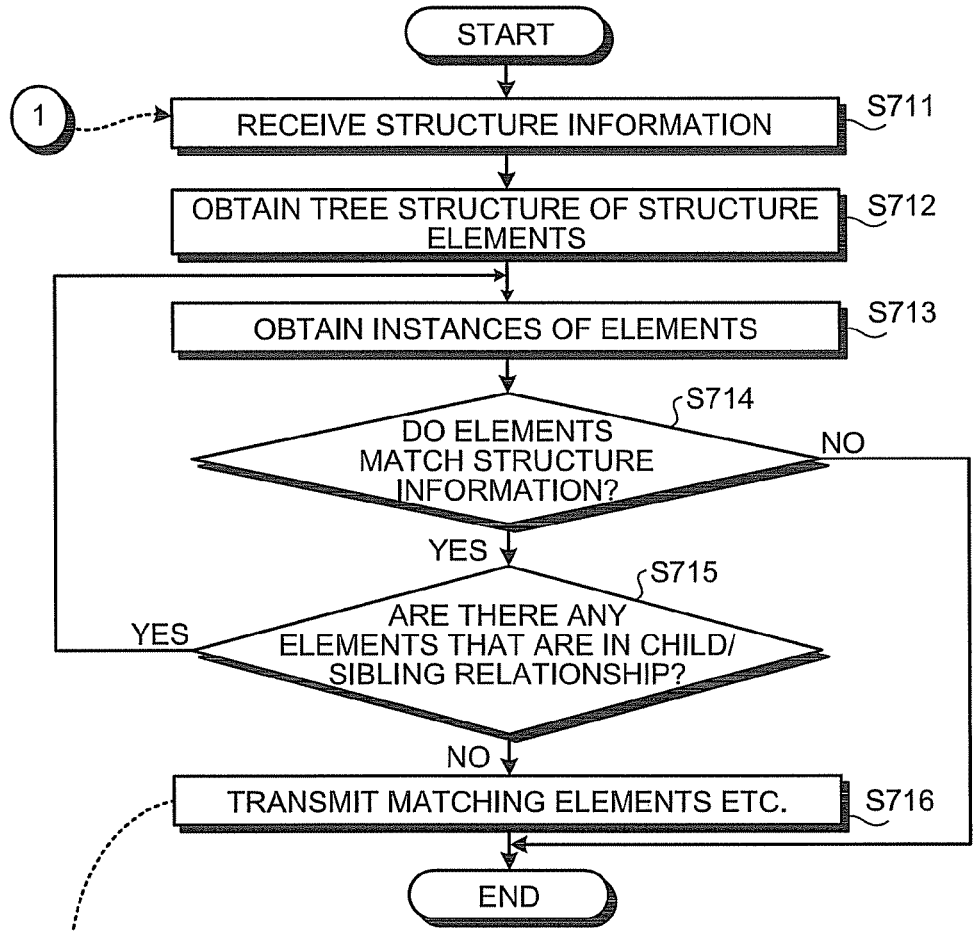
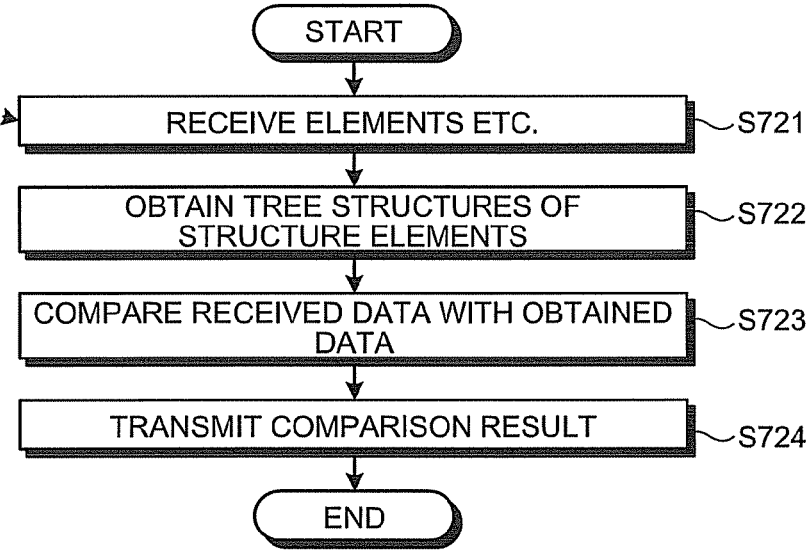

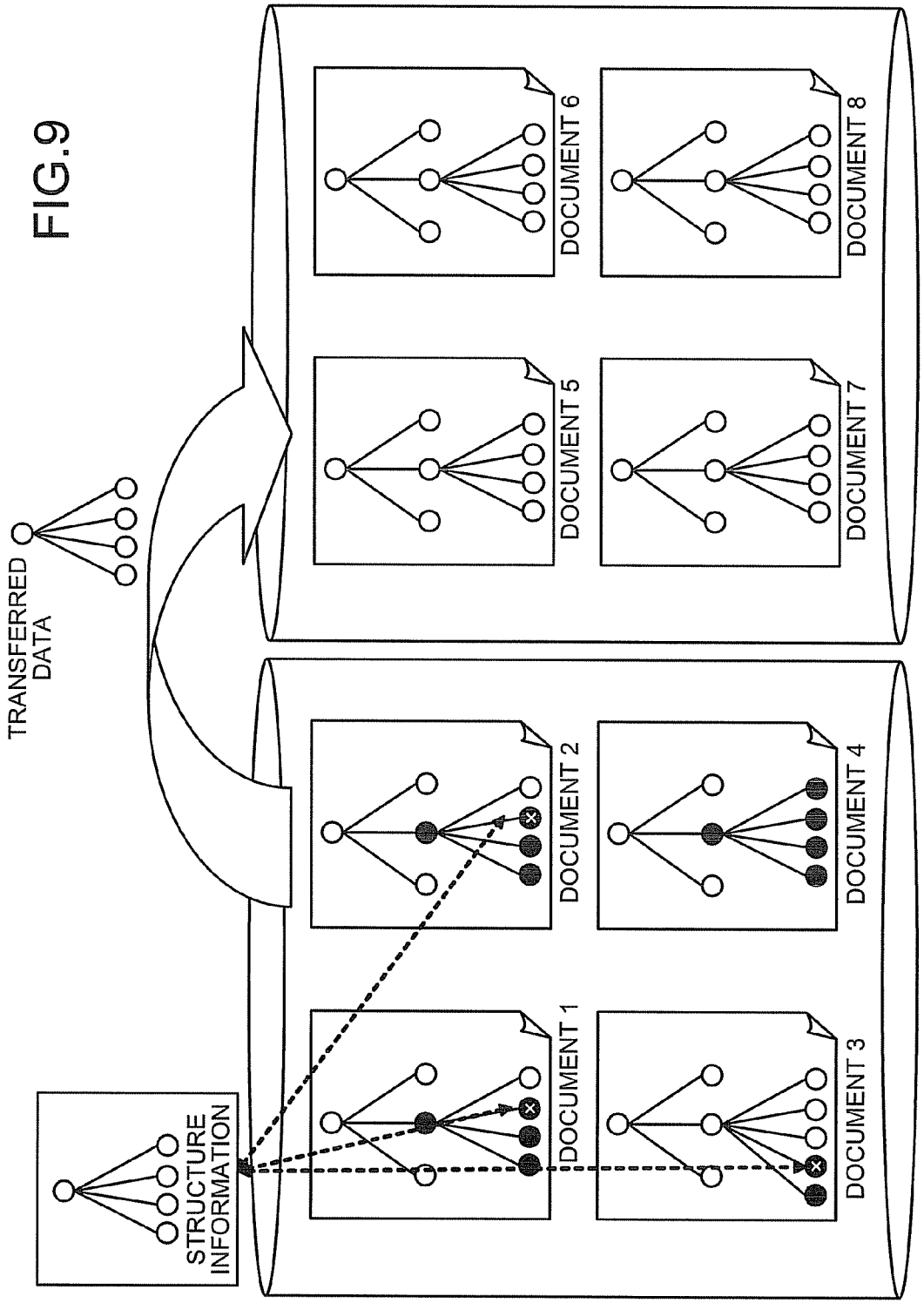

FIG.10

```xml
<?xml version="1.0" encoding="UTF-8"?>
<ans>
<pc>
<vendor>CompanyD</vendor>
<name>MachineTypePV</name>
<parts>
<cpu>CompanyI</cpu>
<memory>CompanyH</memory>
<dvdd>CompanyT</dvdd>
<hdd>CompanyS</hdd>
</parts>
</pc>
<pc>
<vendor>CompanyT</vendor>
<name>MachineTypeEQ</name>
<parts>
<cpu>CompanyI</cpu>
<memory>CompanyH</memory>
<dvdd>CompanyT</dvdd>
<hdd>CompanyS</hdd>
</parts>
</pc>
</ans>
<ans>
<pc>
<vendor>CompanyD</vendor>
<name>MachineTypePE</name>
<parts>
<cpu>CompanyI</cpu>
<memory>CompanyH</memory>
<dvdd>CompanyT</dvdd>
<hdd>CompanyS</hdd>
</parts>
</pc>
<pc>
<vendor>CompanyT</vendor>
<name>MachineTypeEQ</name>
<parts>
<cpu>CompanyI</cpu>
<memory>CompanyH</memory>
<dvdd>CompanyT</dvdd>
<hdd>CompanyS</hdd>
</parts>
</pc>
</ans>
```

DOCUMENT SEARCHING SYSTEM AND DOCUMENT SEARCHING METHOD

CROSS-REFERENCE TO RELATED APPLICATIONS

This application is based upon and claims the benefit of priority from the prior Japanese Patent Application No. 2007-47860, filed on Feb. 27, 2007; the entire contents of which are incorporated herein by reference.

BACKGROUND OF THE INVENTION

1. Field of the Invention

The present invention relates to a document searching system and a document searching method used for conducting a search in a structured document having a logical structure that is logical and hierarchized.

2. Description of the Related Art

Conventionally, distributed relational database systems are popularly used to deal with a large amount of computerized documents. In a case where a distributed relational database system is in a large scale, the data in the documents is converted so as to conform to a predetermined schema before being stored into a plurality of computing machines. In such a distributed relational database system, an interface is provided for the user as if one computing machine and one database were used. In this situation, the schema denotes a definition related to structures of tables and columns used in the database system and the order in which the pieces of data are stored in the database system.

In the distributed relational database system, when a search request has been received from the user, the plurality of computing machines that are connected to one another via a network perform an execution process in collaboration. As a result, it is possible to realize an advanced searching function to conduct a search in a large-scale group of documents, which is too large to store in one computing machine.

In a distributed database system, a system called "shard-nothing type" is also used. In a "shared-nothing type" system, the data is stored into each of the computing machines in an exclusive manner so that it is possible to store a larger amount of documents. In this type of distributed database system, a function to perform a join operation is provided so that it is possible to conduct a search among the plurality of computing machines. When such a join operation is performed, the computing machines need to transfer interim result data to and from one another.

Accordingly, such a distributed database system has a problem where the throughput and the response are degraded because of the time to transfer the interim search result data. To solve the problem, many techniques related to the join operation have been proposed, including an example disclosed in JP-A 2001-109758 (KOKAI). JP-A 2001-109758 (KOKAI) discloses a technique that uses a multiple mapping mechanism in which one view table is able to store therein mutually different criteria that are mapped in a plurality of mapping processes and that makes it possible to switch between databases to be accessed, without having to switch the view table to another one and without having to change the access items in the view table. This technique makes it possible to flexibly respond to changes in the data being a target of the access. Also, as a method for executing the join operation, a semi-join method and a hash join method have been proposed.

As explained above, in the distributed database system, by using the various methods for executing the join operation that have conventionally been proposed, it is possible to reduce the amount of data transfer.

In recent years, structured documents have rapidly grown popular. Because structured documents have grown popular, structured document databases that specialize in structured documents are also becoming popular so that it is possible to manage a large amount of structured documents.

A structured document is a document that includes data contents and a data structure, while the data structure has a logical relationship (i.e., a document logical structure) with elements. Examples of meta languages used for writing a structured document include Standard Generalized Markup Language (SGML) and eXtensible Markup Language (XML) that is formulated by World Wide Web Consortium (W3C) and has rapidly been growing popular recently.

A structured document database uses a search language for the structured documents and stores therein information that expresses the logical relationships among the elements that are stored in the structured documents. When a search is conducted in the structured documents, it is possible to realize a search having a high level of precision by specifying a logical structure of the elements with a search formula and specifying the structure of the structured documents as a search criterion. For example, JP-A 2005-190163 (KOKAI) discloses a technique for storing, as a template, information in which commonalities and regularities of the logical structures in a group of structured documents are condensed and using the template when a search is conducted.

Next, the search formula that is used in a case where the structured documents are XML documents will be explained. In the search formula, for example, XML Path Language (XPath Language) or XML Query Language (XQuery Language) that are formulated by W3C is used to specify a structure of the structured documents as a search criterion.

XPath is a language in which a method for writing path formulae used for specifying a specific element or a specific attribute within an XML document is defined. XQuery includes XPath as its subset and is a search language for XML documents in which it is possible to write complicated operations, such as a repetition, an assignment, and a comparison, that are performed on an XML element or an attribute specified using XPath or to generate XML elements and attributes. By using these search languages, it is possible to write search formulae that are more complicated than conventional search formulae.

In a distributed structured document database system in which structured documents are stored while being distributed in a plurality of computing machines, sometimes it is necessary to transfer interim result data having a logical structure when a join operation is performed by using a search formula as described above. In this situation, by applying the method for executing the join operation described above to the distributed structured document database, it is possible to reduce the cost of the transfer process.

However, in the distributed structured document database system, problems as explained below that are unique to the system arise: First, in a distributed relational database as described above, when a semi-join operation is performed, because data is joined by using a predetermined field as a join key, only the data in the field needs to be transferred. On the other hand, in a distributed structured document database, in some situations, the elements in a join key have a logical structure. For example, in some situations, a join key may be a sequence having a sequence structure, and the elements may have a deep tag (list) structure that includes numerical values and character strings such as XML nodes (i.e., XML sub-trees). As explained here, a join key used in a distributed structured document database system has a high possibility of having a larger data size than a join key used in a distributed relational database.

Consequently, a distributed structured document database has a problem where, even if the amount of data transfer is reduced by using the semi-join method or the like, the amount of data transfer increases because the data size of the join key is large, and therefore the response is degraded.

SUMMARY OF THE INVENTION

According to one aspect of the present invention, a document searching system includes a first storing apparatus that stores structured documents in each of which elements are logically hierarchized; a second storing apparatus that stores structured documents in each of which elements are logically hierarchized; and a document managing apparatus that manages the first storing apparatus and the second storing apparatus, and that is connected to the first storing apparatus and the second storing apparatus. The document managing apparatus includes a structure storage unit that stores structure information indicating a hierarchical structure that collectively includes hierarchy positional relationships of the elements in the structured documents stored in the first storing apparatus and the second storing apparatus in a collective manner; an extracting unit that extracts an identical element from the structure information, the identical element being a predetermined element in the structured documents stored in the second storing apparatus that matches an element in the structured documents stored in the first storing apparatus; and a transmitting unit that transmits the identical element to the first storing apparatus. The first storing apparatus includes a first storage unit that stores the structured documents; a first receiving unit that receives the identical element from the document managing apparatus; a first searching unit that conducts a search in the structured documents stored in the first storage unit for one of the structured documents that contains the identical element; and a first transmitting unit that transmits to the second storing apparatus, the identical element contained in the one of the structured documents found in the search and text information for the identical element, while keeping the identical element and the text information in correspondence with each other. The second storing apparatus includes a second receiving unit that receives from the first storing apparatus, the identical element together with the text information that is kept in correspondence with the identical element; and a second searching unit that conducts a search for one of the structured documents containing the identical element that matches the received text information.

According to another aspect of the present invention, a document searching method conducts a search in a first storing apparatus and a second storing apparatus that each store structured documents in each of which elements are logically hierarchized. The document searching method includes extracting an identical element from structure information that is stored in a structure storage unit and shows a hierarchical structure that collectively includes hierarchy positional relationships of the elements in the structured documents stored in the first storing apparatus and the second storing apparatus in a collective manner, the identical element being a predetermined element in the structured documents stored in the second storing apparatus that matches an elements in the structured documents stored in the first storing apparatus; transmitting the extracted identical element to the first storing apparatus; receiving the transmitted identical element at the first storing apparatus; conducting a search in the structured documents stored in a first storage unit for one of the structured documents that contains the identical element; transmitting to the second storing apparatus, the identical element contained in the one of the structured documents found in the search and text information for the identical element, while keeping the identical element and the text information in correspondence with each other; receiving the identical element together with the text information that is kept in correspondence with the identical element, at the second storing apparatus from the first storing apparatus; and conducting a search for one of the structured documents containing the identical element that matches the received text information.

BRIEF DESCRIPTION OF THE DRAWINGS

FIG. 5 is a diagram illustrating an example of a group of structured documents stored in a second structured-document-data storing unit;

FIG. 6 is a drawing for explaining query expressions used in a search that includes a join operation and in a distributed structured document database system;

FIG. 7A is a flowchart of an example of a process procedure to conduct a join search in the distributed structured document database system;

FIG. 7B is a flowchart of an example of a process procedure to conduct a join search in the distributed structured document database system;

FIG. 9 is a schematic diagram illustrating an example of a process from a time when the first database processing apparatus specifies a structured document containing a node that matches a structure in search-purpose structure information, until the first database processing apparatus transmits the data of the node contained in the structured document to the second database processing apparatus;

FIG. 10 is a diagram illustrating an example of a search result list generated by an executing unit.

DETAILED DESCRIPTION OF THE INVENTION

In the following sections, exemplary embodiments of a document searching system and a document searching method according to the present invention will be explained in detail, with reference to the accompanying drawings.

Figure 1:
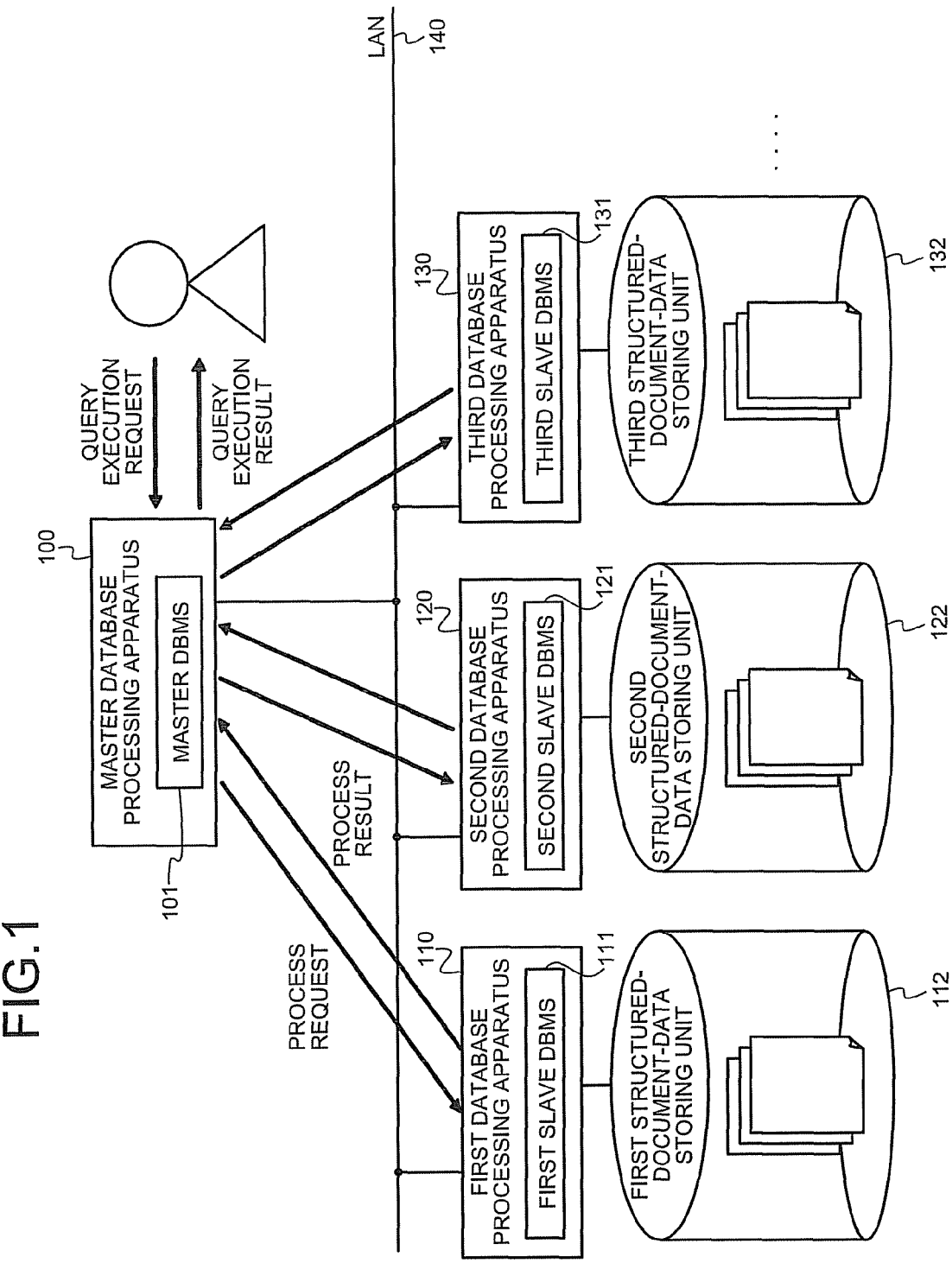
FIG. 1 is a block diagram illustrating a distributed structured document database system according to an embodiment of the present invention.

As shown in FIG. 1, in a distributed structured document database system according to an embodiment of the present invention, a master database processing apparatus 100, a first database processing apparatus 110, a second database processing apparatus 120, and a third database processing apparatus 130 are connected to one another via a Local Area Network (LAN) 140.

In the present embodiment, documents in an XML format are used as structured documents. However, the present invention is not limited to the example with the documents in the XML format. It is acceptable to use documents in any other formats.

The master database processing apparatus 100 includes a master Database Management System (DBMS) 101. The first database processing apparatus 110 includes a first slave DBMS 111 and is connected to a first structured-document-data storing unit 112. The second database processing apparatus 120 includes a second slave DBMS 121 and is connected to a second structured-document-data storing unit 122. The third database processing apparatus 130 includes a third slave DBMS 131 and is connected to a third structured-document-data storing unit 132. Structured documents are stored in the first slave DBMS 111, the second slave DBMS 121, and the third slave DBMS.

The master database processing apparatus 100 receives a query execution request from a user. The master database processing apparatus 100 then generates an execution instruction according to the received query execution request and transmits the generated execution instruction to one or more apparatuses out of the first database processing apparatus 110, the second database processing apparatus 120, and the third database processing apparatus 130.

When having received the execution instruction from the master database processing apparatus 100, the first database processing apparatus 110, the second database processing apparatus 120, and/or the third database processing apparatus 130 perform the actual processes such as a data obtaining process, a sorting process, a data transfer process, and a joining process, on the first structured-document-data storing unit 112, the second structured-document-data storing unit 122, and/or the third structured-document-data storing unit 132, respectively, according to the received execution instruction.

In the present embodiment, an example in which the distributed structured document database system is made up of one master apparatus and three slave apparatuses will be explained, with reference to FIG. 2. The processes described in the present embodiment are applicable to any system in which structured documents are distributed and stored into each slave apparatus in an exclusive manner. It is possible to apply the processes to apparatuses and networks having any other configurations besides the ones described in the present embodiment.

The master database processing apparatus 100 includes the master DBMS 101 and is connected to a structure information storing unit 201. The master DBMS 101 includes an external communication processing unit 211, a search processing unit 212, an internal communication processing unit 213, and a data storing processing unit 214.

The external communication processing unit 211 performs communication via the LAN 140 or the like that is connected to a personal computer (PC) or the like operated by the user. The external communication processing unit 211 receives, from the user, various types of instructions such as a storing instruction for storing structured documents and query execution instructions, as well as data such as the structured documents to be stored and the queries to be executed. Because the external communication processing unit 211 receives query expressions showing search criteria, the external communication processing unit 211 corresponds to, in other words, a receiving unit that receives an instruction that a join search should be conducted between other database processing apparatuses by using the search criteria.

The internal communication processing unit 213 includes a transmitting unit 218 and a receiving unit 219 and performs communication with the first database processing apparatus 110, the second database processing apparatus 120, and the third database processing apparatus 130.

The transmitting unit 218 transmits the execution instructions instructing that a join search should be conducted, search-purpose structure information used in the join searches, and the structured documents to be stored, to the first database processing apparatus 110, the second database processing apparatus 120, and the third database processing apparatus 130.

The receiving unit 219 receives information such as search results and interim result data from the first database processing apparatus 110, the second database processing apparatus 120, and the third database processing apparatus 130.

The structure information storing unit 201 stores therein structure information of structured document data that is stored in the first structured-document-data storing unit 112, the second structured-document-data storing unit 122, and the third structured-document-data storing unit 132, which will be explained later.

The structure information is information that stores therein the structures of the structured documents. According to the present embodiment, the structure information is, for example, a schema that defines the structure of each of the structured documents or a structured template that stores therein a structure extracted from each of the structured documents. With this arrangement, the structure information stores therein, in a collective manner, hierarchy positional relationships of the nodes that are contained the structured documents.

The structure information storing unit 201 is a storage unit that stores therein the structure information. The structure information storing unit 201 may be configured with any of various types of storage units that are commonly used, such as a Hard Disk Drive (HDD), an optical disk, a memory card, and a Random Access Memory (RAM).

Apart from the present embodiment, in a case where there is no schema that defines the structured document data, the structure information storing unit 201 stores therein information of structures that have been extracted from the structured documents by the data storing processing unit 214, which is explained later. The information of the structures that have been extracted from the structured documents is used as a structure template.

Figure 3:
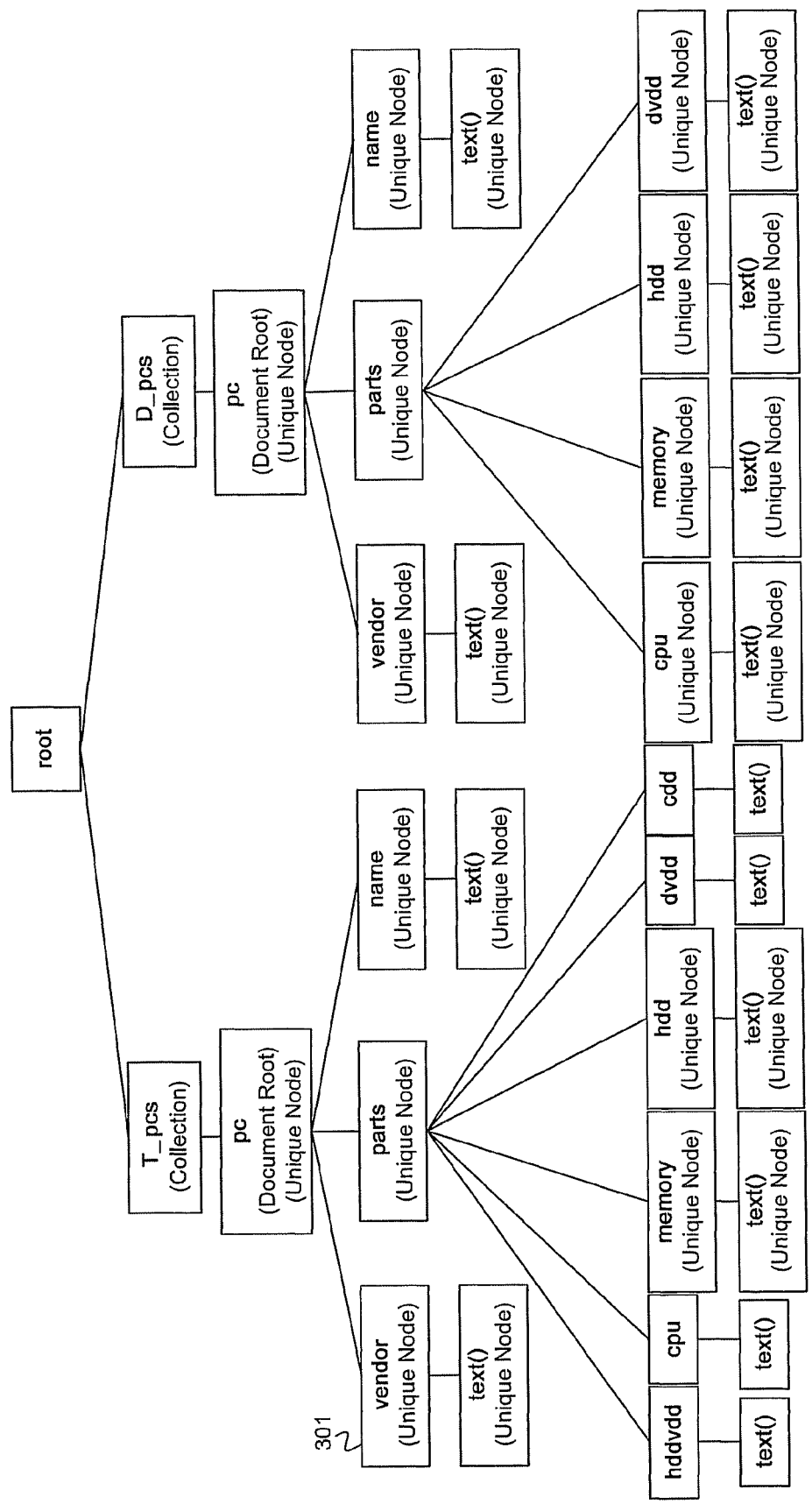
FIG. 3 is a schematic diagram illustrating structure information of structured documents that is defined with schemas and is stored in a structure information storing unit.

As shown in FIG. 3, in the structure information, path structures that are the same as one another are put together. Also, in the structure information, when a node is a root node of a group of structured documents, a "Document Root" flag is appended to the node. In addition, in the structure information, when a node is such a node that is, without exception, present only once, a "Unique Node" flag is appended to the node as indicated with the reference character 301. The "Unique Node" flag indicates that the node is unique. Further, when the structure information is a schema, the structure information defines, in addition to the flags and the like described above, information such as the number of times each node is repeated and the data type of the stored data, as well. In the description of the present embodiment, the example in which the elements are nodes is explained. However, it is acceptable to use any information other than nodes.

The data storing processing unit 214 performs a process of storing a structured document received by the external communication processing unit 211 into one of the first structured-document-data storing unit 112, the second structured-document-data storing unit 122, and the third structured-document-data storing unit 132. Also, in a case where no schema is stored in the structure information storing unit 201, the data storing processing unit 214 performs a process of extracting the information of the structure from the received structured document, and further performs a process of storing the extracted information of the structure into the structure information storing unit 201 as a structure template.

The search processing unit 212 includes a query analyzing unit 215, an extracting unit 216, and an executing unit 217. The search processing unit 212 performs processes related to a search, such as a process of generating an execution instruction for performing a searching process in another database processing apparatus according to a received query and a process of generating a search result list that shows a search result.

The query analyzing unit 215 performs a syntax analysis on the query received by the external communication processing unit 211.

The extracting unit 216 extracts structure information that matches the result of the syntax analysis out of the structure information storing unit 201 and generates search-purpose structure information that expresses the analyzed query. The details of the search-purpose structure information will be explained later.

The executing unit 217 includes a generating unit 220 and performs a process for conducting a join search based on the generated search-purpose structure information. For example, the executing unit 217 generates an execution instruction for conducting the join search in one or more apparatuses out of the first database processing apparatus 110, the second database processing apparatus 120, and the third database processing apparatus 130, by using the generated search-purpose structure information. The executing unit 217 then requests the transmitting unit 218 to transmit the generated execution instruction and the search-purpose structure information. Also, after the executing unit 217 requests that the execution instruction and the like should be sent to the first database processing apparatus 110, the second database processing apparatus 120, and/or the third database processing apparatus 130, the executing unit 217 manages the search result and the interim result.

The generating unit 220 generates a search result list based on the interim result and the search result that are managed. The search result list will be explained later.

The first database processing apparatus 110 includes the first slave DBMS 111 and is connected to the first structured-document-data storing unit 112. The first slave DBMS 111 includes an internal communication processing unit 221, a search processing unit 222, and a data storing processing unit 223.

The first structured-document-data storing unit 112 is a storage unit that stores therein structured documents in a recoverable format. The first structured-document-data storing unit 112 may be configured with any of various types of storage units that are commonly used, such as a Hard Disk Drive (HDD), an optical disk, a memory card, and a Random Access Memory (RAM). Further, the first structured-document-data storing unit 112 also stores therein index information used for conducting a search in the structured documents. The first structured-document-data storing unit 112, the second structured-document-data storing unit 122, and the third structured-document-data storing unit 132 each store therein the structured documents in an exclusive manner.

The second structured-document-data storing unit 122 and the third structured-document-data storing unit 132 explained later are also each configured with a storage unit like the first structured-document-data storing unit 112. The second structured-document-data storing unit 122 and the third structured-document-data storing unit 132 also each store therein the structured documents in an exclusive manner with respect to the other structured-document-data storing units.

Figure 4:
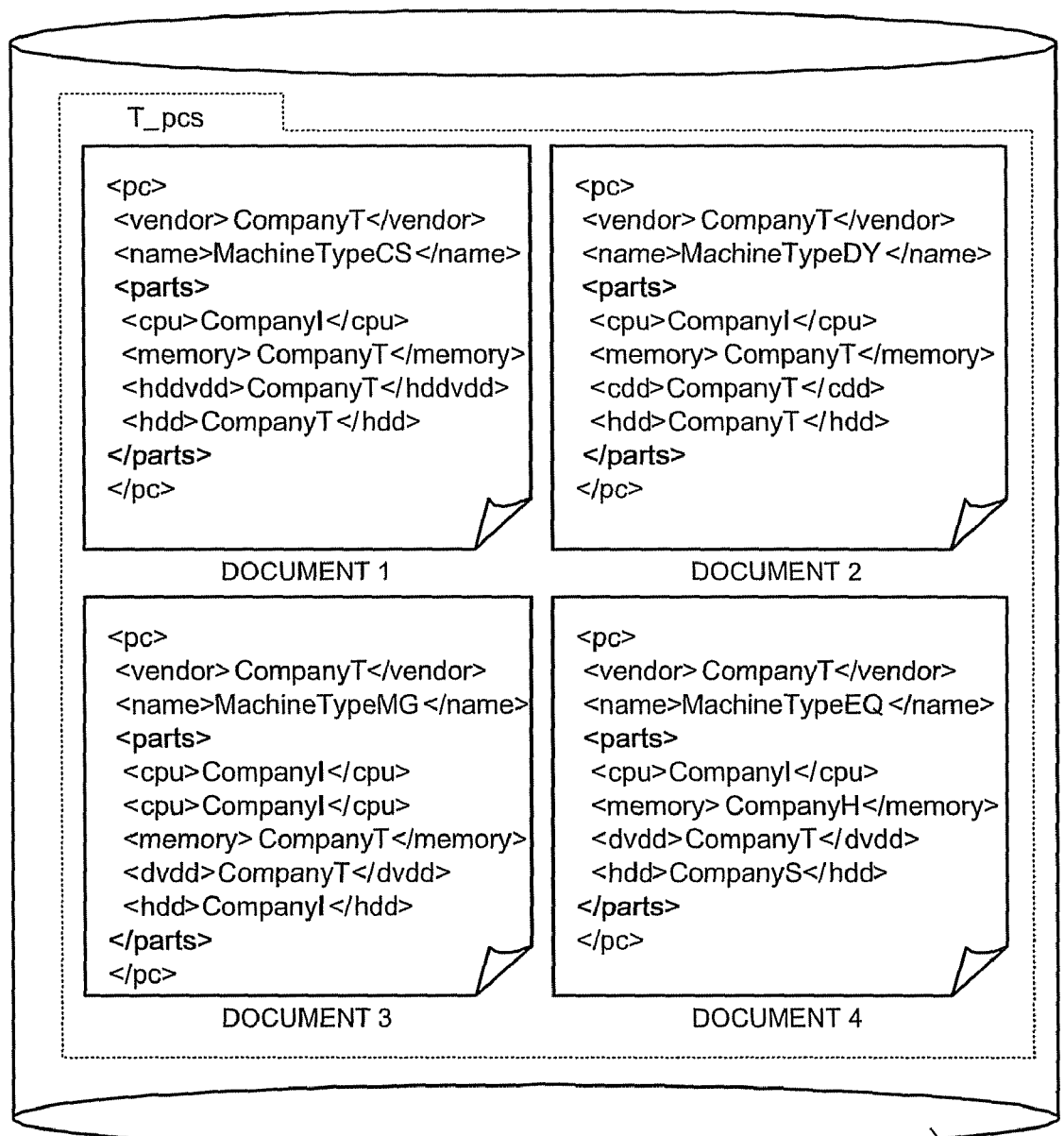
FIG. 4 is a diagram illustrating an example of a group of structured documents stored in a first structured-document-data storing unit.

As shown in FIG. 4, the first structured-document-data storing unit 112 stores therein four structured documents (i.e., XML documents). A structured document 1, a structured document 2, a structured document 3, and a structured document 4 that are shown in FIG. 4 each store therein the information of one model of personal computers (PCs). Also, as shown in FIG. 4, the structured documents stored in the first structured-document-data storing unit 112 are the XML documents each of which stores therein the information of a PC manufactured by "Company T".

Each of the XML documents shown in FIG. 4 stores therein the information of the component parts (hereinafter, "parts information") of a PC, the information positioned between a tag "<parts>" and another tag "</parts>". As the parts information, some of the XML documents (e.g., the structured document 1) contain a tag "<hddvd>", while the other XML documents (e.g., the structured document 2) do not contain the tag "<hddvd>". As another example, a tag "<cpu>" appears a plurality of times in some of the XML documents, while the tag "<cpu>" appears only once in the other XML documents. As explained here, various kinds of information are stored in each of the XML documents, while being positioned between tags.

Figure 2:
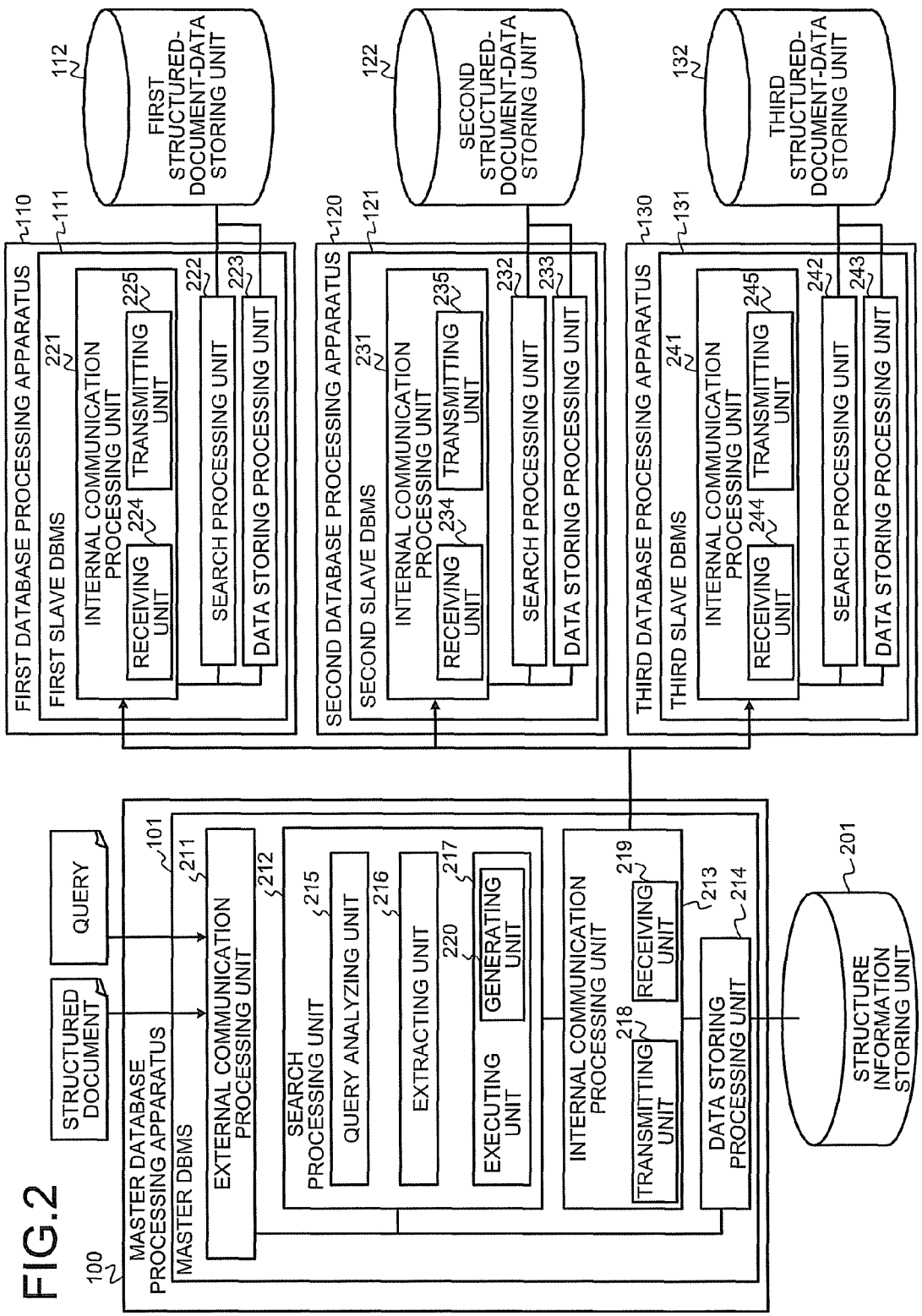
FIG. 2 is a block diagram illustrating a master database processing apparatus, a first database processing apparatus, a second database processing apparatus, and a third database processing apparatus according to the embodiment.

Returning to the description of FIG. 2, the internal communication processing unit 221 includes a receiving unit 224 and a transmitting unit 225 and transmits and receives data to and from the second database processing apparatus 120, the third database processing apparatus 130, and the master database processing apparatus 100.

The receiving unit 224 receives, from the master database processing apparatus 100, the execution instruction, the search-purpose structure information, or the structured documents to be stored. The receiving unit 224 receives, from the second database processing apparatus or the third database processing apparatus 130, the interim result data and the search result data obtained from the search.

The transmitting unit 225 transmits the interim result data or the search result data to the master database processing apparatus 100. Also, the transmitting unit 225 transmits, to the second database processing apparatus 120 or the third database processing apparatus 130, the execution instruction and the search-purpose structure information that have been received from the master database processing apparatus 100, as well as the interim result data or the search result data.

The interim result data is data that indicates the interim research result obtained from a join search. It is possible to conduct the join search because the interim result data is transmitted to the second database processing apparatus 120 or the third database processing apparatus 130. The interim result data is also transmitted to the master database processing apparatus 100. With this arrangement, the master database processing apparatus 100 is able to manage the progress of the join search. The search result data is data that indicates a result of the join search.

The search processing unit 222 performs the actual processes such as the data obtaining process, the sorting process, the data transfer process, and the joining process on the first structured-document-data storing unit 112 according to the execution instruction from the master database processing apparatus 100 that has been received by the receiving unit 224. The search processing unit 222 then outputs interim result data or search result data. Also, in a case where a join search is to be conducted, the search processing unit 222 searches in the structured documents stored in the first structured-document-data storing unit 112 for one or more of the structured documents each of which contains a node that is identical to a node contained in the search-purpose structure information. Also, when conducting this search, the search processing unit 222 traverses the nodes in the structured documents stored in the first structured-document-data storing unit 112 according to the received search-purpose structure information and performs an instantiating process on the text information of all or a part of the structured documents that match a data obtaining criterion.

The data storing processing unit 223 performs a process of storing the structured documents received from the master database processing apparatus 100 into the first structured-document-data storing unit 112. The data storing processing unit 223 also performs a process of generating index information used for conducting the search in the structured documents stored in the first structured-document-data storing unit 112. The generated index information is also stored into the first structured-document-data storing unit 112.

The second database processing apparatus 120 includes the second slave DBMS 121 and is connected to the second structured-document-data storing unit 122. The second slave DBMS 121 includes an internal communication processing unit 231, a search processing unit 232, and a data storing processing unit 233, the internal communication processing unit 231 including a receiving unit 234 and a transmitting unit 235. The processes performed by the internal communication processing unit 231, the search processing unit 232, and the data storing processing unit 233 are the same as the processes performed by the internal communication processing unit 221, the search processing unit 222, and the data storing processing unit 223 that are included in the first slave DBMS 111. Thus, the explanation thereof will be omitted.

The second structured-document-data storing unit 122 is a storage unit that stores therein the structured documents in a recoverable format. As shown in FIG. 5, the second structured-document-data storing unit 122 stores therein four structured documents (i.e., XML documents). A structured document 5, a structured document 6, a structured document 7, and a structured document 8 that are shown in FIG. 5 each store therein information of one model of PCs. Also, as shown in FIG. 5, the structured documents stored in the second structured-document-data storing unit 122 are the XML documents each of which stores therein the information of a PC manufactured by "Company D". Like in the XML documents shown in FIG. 4, each of the XML documents shown in FIG. 5 also stores therein the parts information of a PC, the parts information being positioned between a tag "<parts>" and another tag "</parts>".

Returning to the description of FIG. 2, the third database processing apparatus 130 includes the third slave DBMS 131 and is connected to the third structured-document-data storing unit 132. The third slave DBMS 131 includes an internal communication processing unit 241, a search processing unit 242, and a data storing processing unit 243, the internal communication processing unit 241 including a receiving unit 244 and a transmitting unit 245. The processes performed by the internal communication processing unit 241, the search processing unit 242, and the data storing processing unit 243 are the same as the processes performed by the internal communication processing unit 221, the search processing unit 222, and the data storing processing unit 223 that are included in the first slave DBMS 111. Thus, the explanation thereof will be omitted. The third structured-document-data storing unit 132 is a storage unit that stores therein the structured documents in a recoverable format. Explanation of the examples of the structured documents that are stored in the third structured-document-data storing unit 132 will be omitted to simplify the explanation of the present invention.

Next, the join search that is conducted in the distributed structured document database system according to the present embodiment will be explained. In the description of an example of the process procedure below, an example will be explained in which the join search is conducted in the first structured-document-data storing unit 112 and the second structured-document-data storing unit 122. However, the present embodiment is not limited to the example in which the search targets of the join search are the first structured-document-data storing unit 112 and the second structured-document-data storing unit 122. It is acceptable to use any structured-document-data storing units as the search targets. Also, it is acceptable to conduct the join search by joining three or more structured-document-data storing units.

The query expression shown in FIG. 6 is written in XQuery and instructs that the personal computers "manufactured by Company T (T_pcs)" that are stored in the first structured-document-data storing unit 112 should be compared with the personal computers "manufactured by Company D (D_pcs)" that are stored in the second structured-document-data storing unit 122, so as to check to see if the parts configurations (i.e., the tag names/the structures) completely match and to list up all the sets each made up of a personal computer manufactured by "Company T" and a personal computer manufactured by "Company D" in which the parts configurations completely match. Also, the query expression instructs that the detected sets each made up of a personal computer manufactured by "Company T" and a personal computer manufactured by "Company D" should be written between a tag "<ans>" and another tag "</ans>". According to the present embodiment, XQuery is used to write the query expression. However, it is acceptable to use any other language.

Next, a process procedure performed in the distributed structured document database system to conduct a join search in the first structured-document-data storing unit 112 and the second structured-document-data storing unit 122 will be explained, with reference to FIG. 7A.

First, the external communication processing unit 211 included in the master database processing apparatus 100 receives, from a PC of a user or the like, a query (i.e., a query expression) instructing that, for example, a search should be conducted (step S701).

Next, the query analyzing unit 215 analyzes the received query (step S702). The query analyzing unit 215 then judges whether it is necessary to conduct a join search, based on the result of the analysis (step S703).

In a case where the query analyzing unit 215 has judged that it is not necessary to conduct a join search (step S703: No), a normal process is performed (not shown), and thus the process is ended.

In a case where the query analyzing unit 215 has judged that it is necessary to perform a join search (step S703: Yes), the extracting unit 216 obtains a group of paths for a join key on the transmission side, out of the structure information storing unit 201 (step S704). For example, in a case where a join search is to be conducted using the query expression shown in FIG. 6, the extracting unit 216 obtains a group of paths positioned subordinate to the path "/T_pcs/pc" corresponding to the first structured-document-data storing unit 112, out of the structure information storing unit 201. As additional information, in a case where the join key on the transmission side is expressed in the query expression by using a relative path such as "//cpu", the extracting unit 216 obtains the group of paths after converting the relative path to an absolute path such as "/T_pcs/pc/parts/cpu". In addition, the extracting unit 216 extracts "Unique Nodes" that are specified with some of the nodes in the group of paths.

In this situation, the "transmission side" denotes, in a case where a join search is conducted between two slave DMBSs, a database processing apparatus that is on the side at which interim search data in the join search is generated and from which the generated interim search data is transmitted to another database processing apparatus. A "reception side" denotes a data processing apparatus that is on the side at which the interim result data in the join search is received from another data processing apparatus and at which search result data of the join search is generated.

Next, the extracting unit 216 obtains a group of paths for a join key on the reception side, out of the structure information storing unit 201 (step S705). For example, in the case where the query expression shown in FIG. 6 is used, the extracting unit 216 obtains a group of paths positioned subordinate to the path "/D_pcs/pc" corresponding to the second structured-document-data storing unit 122, out of the structure information storing unit 201. In addition, the extracting unit 216 extracts the "Unique Nodes" that are specified with some of the nodes in the group of paths.

The extracting unit 216 compares the obtained group of paths for the join key on the transmission side with the obtained group of paths for the join key on the reception side, with respect to the names of the nodes contained in the groups of paths, and extracts identical nodes out of the groups of paths, identical nodes being a set of nodes of which the name matches (step S706). For example, in a case where the group of paths extracted as the join key on the transmission side includes "/a/b" and "/a", whereas the group of paths extracted as the join key on the reception side includes "/b" and "/b/c", the name "a" is not present in the nodes in the group of paths for the join key on the reception side, and the name "c" is not present in the nodes in the group of paths for the join key on the transmission side. Thus, the extracting unit 216 extracts only the path "/a/b" for the join key on the transmission side and the path "/b" for the join key on the reception side, while excluding the path "/a" and the path "/b/c".

When the join search is conducted by using the query expression shown in FIG. 6, the extracting unit 216 checks to see if "parts" that is in a child relationship with the path "/T_pcs/pc" obtained at step S704 and "parts" that is in a child relationship with the path "/T_pcs/pc" obtained at step S705 are in correspondence with each other. Also, according to the query expression, the extracting unit 216 checks to see if the names of the nodes including the node "parts" and the nodes positioned subordinate thereto are present in the join key on the reception side and the join key on the transmission side.

Another arrangement is acceptable in which the extracting unit 216 determines which one of the database processing apparatuses being the search target should be used as the apparatus on the reception side or as the apparatus on the transmission side, based on the extracted groups of paths. For example, in the case where the groups of paths having the correspondence relationships describe above have been extracted, an arrangement is acceptable in which the extracting unit 216 determines that the database processing apparatus that contains, as the attributes of the nodes, a larger number of "Unique Nodes" in the group of paths should be used as the apparatus on the reception side. With this arrangement, the apparatus on the transmission side checks to see if each of the nodes is unique and transmits only the information stored in the structured documents in which the nodes are unique. As a result, it is possible to reduce the amount of data that needs to be transmitted. In the process procedure described above, the first database processing apparatus 110 is on the reception side, whereas the second database processing apparatus 120 is on the transmission side.

Next, the extracting unit 216 generates search-purpose structure information that contains only the group of paths for the join key on the reception side that has been extracted at step S706 (step S707). In addition, the extracting unit 216 generates an execution instruction for the first database processing apparatus 110 and the second database processing apparatus 120. The extracting unit 216 extracts an identical node that is one of the nodes including the node "/parts/" and the nodes positioned subordinate thereto in the structured documents stored in the second database processing apparatus 120 and that matches any of the nodes including the node "/parts/" and the nodes positioned subordinate thereto in the structured documents stored in the first database processing apparatus 110. The extracting unit 216 further generates the search-purpose structure information that contains the extracted identical node.

Figure 8:
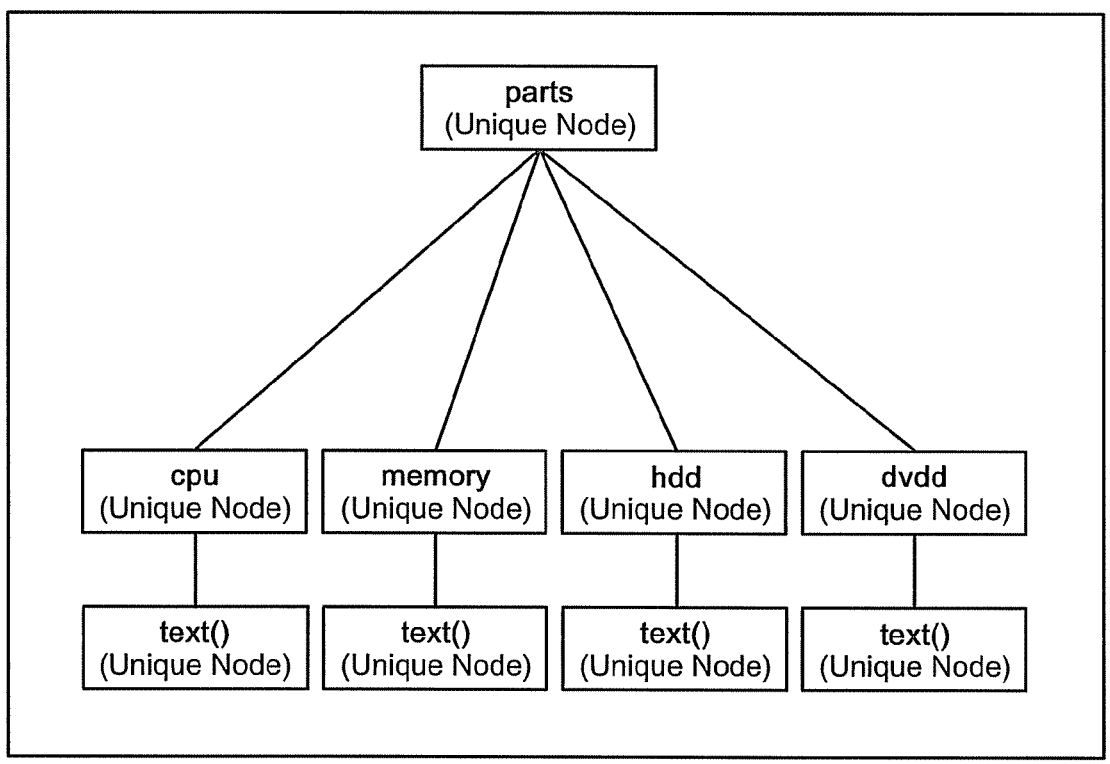
FIG. 8 is a schematic diagram illustrating an example of search-purpose structure information generated by an extracting unit.

In the example with the query expression shown in FIG. 6, as shown in FIG. 8, in the search-purpose structure information, the node "cpu", the node "memory", the node "hdd", and the node "dvdd" are shown under the node "parts". This is because the extracting unit 216 has compared the group of nodes shown in FIG. 3 that is in a child relationship with the node "T_pcs/pc/parts" with the group of nodes that is in a child relationship with the node "D_pcs/pc/parts" and has extracted a group of nodes that is present in both of the groups of nodes, out of the nodes that are subordinate to "D_pcs/pc/parts" (i.e., the nodes on the reception side). The generated search-purpose structure information also includes the attribute information such as the "Unique Nodes" that have been extracted by the extracting unit 216. The attribute information such as the "Unique Nodes" is brought into correspondence with the corresponding nodes.

Returning to the description of FIG. 7A, the transmitting unit 218 transmits the generated search-purpose structure information, the execution instruction, and the group of paths extracted at step S706 to the database processing apparatus on the transmission side in the join search (e.g., the first database processing apparatus 110) (step S708). Further, although the process hereafter is not shown in the drawings, the master database processing apparatus 100 manages the progress of the join search, based on reception of interim result data or the like that is received from the first database processing apparatus 110 or the like.

In the example in which the join search is conducted by using the query expression shown in FIG. 6, the transmitting unit 218 transmits, to the first database processing apparatus 110, the execution instruction, together with the group of paths that is positioned subordinate to the path "/T_pcs/pc/parts" corresponding to the first structured-document-data storing unit 112 and the search-purpose structure information shown in FIG. 8.

Next, referring to FIG. 7B, the process is performed, in turn, in the first database processing apparatus 110 that is positioned on the transmission side in the join search. The receiving unit 224 included in the first database processing apparatus 110 receives, from the master database processing apparatus 100, the search-purpose structure information, the execution instruction, and the group of paths extracted at step S706 (step S711).

In the example in which the join search is conducted by using the query expression shown in FIG. 6, the first database processing apparatus 110 receives the group of paths that are positioned subordinate to the path "/T_pcs/pc/parts", the search-purpose information shown in FIG. 8, and the execution instruction instructing that the join search should be conducted.

Subsequently, the search processing unit 222 performs a process according to the received execution instruction. In the process flow in the present example, because the search processing unit 222 has received the execution instruction instructing that the join search should be conducted, the search processing unit 222 obtains a tree structure of each of the structured documents that are stored in the first structured-document-data storing unit 112 so that the join search can be conducted (step S712). Although not shown in the drawing, the processes at steps S712 through S716 are performed as many times as the number of structured documents that are stored in the first structured-document-data storing unit 112.

After that, the search processing unit 222 recursively traverses from the nodes to their child nodes contained in each of the structured documents, based on the obtained tree structure and obtains instances (including the names of the nodes, the text information, and the like) of the traversed nodes (step S713).

Subsequently, the search processing unit 222 judges whether the obtained nodes match the search-purpose structure information that shows the structures of the structured documents on the reception side (step S714). In a case where the search processing unit 222 has judged that the nodes do not match the search-purpose structure information (step S714: No), the search processing unit 222 discards the obtained instances of the nodes. Also, at the time when the search processing unit 222 discards the instances of the nodes, the search processing unit 222 discontinues the instantiating process of the structured document that contains the nodes.

Next, the process performed by the search processing unit 222 to check to see if the obtained data matches the structure information will be explained. In the case where the search-purpose structure information is a schema, it is possible to check to see if the obtained data matches the schema by performing a commonly-used schema validation process. Thus, the explanation thereof will be omitted. In the case where the structure information is a structure template, when having judged that there is a unique node in the structure template, the search processing unit 222 discards the instance of an obtained node at a time when the node appears twice. It means that when a unique node appears twice, the information of the node will not be transmitted. Also, when having judged that an obtained node is not contained in the structure template, the search processing unit 222 determines that the node is not a transmission target and discards the instance of the node.

Subsequently, when having judged that the obtained node matches the node contained in the search-purpose structure information (step S714: Yes), the search processing unit 222 judges whether there are any nodes (i.e., elements) that are in a child relationship or a sibling relationship, based on the tree structure obtained at step S712 (step S715). In the case where the search processing unit 222 has judged that there are one or more nodes each of which is in a child relationship or a sibling relationship (step S715: Yes), the search processing unit 222 traverses the nodes that are in the child or sibling relationships and obtains the instances of those nodes (step S713).

In a case where the search processing unit 222 has judged that there is no node that is in a child or sibling relationship (step S715: No), the search processing unit 222 ends the traversing process. If the search processing unit 222 judges, after the traversing process is ended, that the nodes contained in the search-purpose structure information are not contained in the structured document, the search processing unit 222 discards the nodes that have been instantiated from the structured document and determines that none of the nodes contained in the structured document will be transmitted.

The example in which the join search is conducted by using the query expression shown in FIG. 6 will be further explained. As shown in FIG. 9, the search processing unit 222 checks to see if the structure of each of the structured documents stored in the first database processing apparatus 110 completely matches the structure in the received search-purpose structure information. First, according to the received execution instruction, the search processing unit 222 obtains the names of the four nodes that correspond to the path "/T_pcs/pc/parts/", out of the received search-purpose structure information, and judges whether the obtained node names completely match the names of the nodes in each of the structured documents stored in the first structured-document-data storing unit 112.

To explain this example further in detail, first, the search processing unit 222 starts traversing from a node "parts" in the structured document 1, sequentially to the child nodes "cpu" and "memory", so as to obtain the instances of the nodes. After that, the search processing unit 222 judges whether the obtained node names match the names of the nodes that are contained in the search-purpose structure information. When the traversing process comes to a node "hddvdd", because the name of this node is not contained in the search-purpose structure information, the search processing unit 222 determines that the structured document 1 is not a transmission target and ends the process performed on the structured document 1.

Next, the search processing unit 222 starts traversing from a node "parts" in the structured document 2, sequentially to the child nodes "cpu" and "memory", so as to obtain the instances of the nodes. After that, the search processing unit 222 judges whether the obtained node names match the names of the nodes that are contained in the search-purpose structure information. When the traversing process comes to a node "cdd", because the name of this node is not contained in the search-purpose structure information, the search processing unit 222 determines that the structured document 2 is not a transmission target and ends the process performed on the structured document 2.

Subsequently, the search processing unit 222 starts traversing from a node "parts" in the structured document 3, sequentially to the child node "cpu", so as to obtain the instances of the nodes. The search processing unit 222 then recognizes that the name of the node being the next traversing target is "cpu". At this point in time, because the attribute of the node "cpu" contained in the search-purpose structure information is "Unique Node", the search processing unit 222 determines that the nodes do not completely match and ends the process performed on the structured document 3. As explained here, when a join search is conducted, in a case where a node is a unique node on the reception side, while the node appears more than once on the transmission side, the search processing unit 222 determines that the nodes do not completely match and excludes the information from the transmission target. With this arrangement, it is possible to reduce the amount of data that needs to be transmitted.

In the following step, the search processing unit 222 starts traversing from a node "parts" in the structured document 4, sequentially to the child nodes "cpu", "memory", "dvdd", and "hdd". Because all the node names match, the search processing unit 222 determines that the instances (e.g., the names of the nodes and the text information) of the nodes including the node "parts" and the nodes positioned subordinate thereto that are contained in the structured document 4 are a transmission target. Thus, the transmitting unit 225 transmits these nodes to the second database processing apparatus 120.

According to the present embodiment, by performing the processes described above, it is necessary to transmit only the data corresponding to the nodes including the node "parts" and the nodes that are positioned subordinate thereto that are contained in the structured document 4. On the contrary, when processes are performed according to conventional techniques, it is necessary to transmit the data corresponding to the nodes including the node "parts" and the nodes positioned subordinate thereto in each of all the structured documents 1 to 4. Thus, according to the present embodiment, it is possible to reduce the amount of data that needs to be transmitted.

Of the nodes shown in FIG. 9, the black circles indicate the nodes of which the instances have been obtained as a result of the traversing process performed by the search processing unit 222. On the other hand, in the processes performed according to the conventional techniques, the traversing process is performed on the nodes including the node "parts" and the nodes positioned subordinate thereto that are contained in each of all of the structured documents 1 to 4, so as to obtain the instances of the nodes. In other words, according to the present embodiment, the search processing unit 222 discontinues the traversing process at the point in time when the search processing unit 222 determines that the node does not match the node on the reception side, as explained above. Thus, it is possible to reduce the number of times the traversing process is performed, compared to the conventional techniques. Consequently, it is possible to make the process load smaller, and also to improve the speed at which the process is performed.

Returning to the description of FIG. 7B, the transmitting unit 225 transmits the instantiated nodes and the execution instruction that have been received from the master database processing apparatus 100 to the second database processing apparatus 120 (step S716). The transmitting unit 225 transmits these pieces of data also to the master database processing apparatus 100 as interim result data. Further, together with the interim result data, the transmitting unit 225 transmits the structured document 4 that has been specified by the search processing unit 222 to the master database processing apparatus 100. As a result, the master database processing apparatus 100 is able to generate a search result list by using the structured document 4.

As additional information, in a case where the hash join method is used, the transmitting unit 225 needs to calculate a hash value only for the nodes including the node "parts" and the nodes positioned subordinate thereto that are contained in the structured document 4.

Subsequently, the process is performed, in turn, in the second database processing apparatus 120 that is positioned on the reception side in the join search. The receiving unit 234 included in the second database processing apparatus 120 receives, from the first database processing apparatus 110, the nodes that have been instantiated by the first database processing apparatus 110, as well as the execution instruction that has been generated by the master database processing apparatus 100, and the group of paths that has been extracted at step S706 (step S721).

After that, the search processing unit 232 performs a process according to the received execution instruction. In the process flow in the present example, having received the execution instruction instructing that a join search should be conducted, the search processing unit 232 obtains the tree structures of the structured documents that are stored in the second structured-document-data storing unit 122 so that the join search can be conducted (step S722).

Subsequently, the search processing unit 232 compares the received data with the obtained data (step S723). More specifically, the search processing unit 232 judges whether the received nodes that have been instantiated by the first database processing apparatus 110 match the nodes in each of the structured documents that are stored in the second structured-document-data storing unit 122. In a case where the search processing unit 232 has judged that the received nodes do not match the nodes in any one of the structured documents, the search processing unit 232 determines that the structured document does not satisfy the search criterion, and the process proceeds to a next structured document so that the received nodes are compared with the nodes contained in the structured document. By performing this process sequentially, the search processing unit 232 is able to specify one or more structured document in each of which the nodes completely match the received nodes. It is acceptable to use any method for comparing these nodes, regardless of whether the method is well known.

In the example in which the join search is conducted by using the query expression shown in FIG. 6, the search processing unit 222 obtains, as the received data, the names and the text information of all of the nodes positioned subordinate to the node "parts" that are contained in the structured document 4. After that, the search processing unit 232 detects one or more structured documents in each of which the names and the text information match those of the nodes that are positioned subordinated to the node "parts" and are contained in the structured document 4.

The text information of the node "cpu" positioned subordinate to the node "parts" in the structured document 4 is "Company I", whereas the text information of the node "memory" is "Company T", and the text information of the node "dvdd" is "Company T", while the text information of the node "hdd" is "Company S". Accordingly, the search processing unit 232 detects the structured document 5 and the structured document 6 as the structured documents that match the search-purpose structure information.

Subsequently, the transmitting unit 245 transmits search result data (including the structured document 5 and the structured document 6) showing the result of the search conducted by the search processing unit 232 to the master database processing apparatus 100 (step S724). Thus, the processes in the join search are completed.

The process procedure described above explains the example in which the comparison criterion in the join search defines that the logical structures and the values should completely match. In a case where the comparison criterion does not define a complete match, it is also possible to perform processes by modifying a part of the process procedure described above.

As a result of the process procedure describe above, the structured document 5 and the structured document 6 have been identified as the structured documents in each of which the nodes including the node "parts" and the nodes positioned subordinate thereto match the nodes in the structured document 4.

The generating unit 220 included in the master database processing apparatus 100 generates a search result list, based on the interim result data that has been received from the first database processing apparatus 110, as well as the search result data that has been received from the second database processing apparatus 120, and the like.

In a search result list shown in FIG. 10, it is observed that a set made up of the structured document 4 and the structured document 5 as well as a set made up of the structured document 4 and the structured document 6 have been generated.

According to the embodiment described above, in the join operation in which the logical structure is specified, it is possible to reduce the amount of data transfer regarding the join keys. It is also possible to reduce the instantiating process of the nodes because the traversing processes performed during the search are reduced. This process procedure is especially effective in a case where the structured documents have a deep logical structure.

Also, according to the present embodiment, even if there is no schema in the data set as described above, it is possible to achieve the same advantageous effect by using the structure template. In addition, in many situations, it is possible to use the process procedure according to the present embodiment together with another existing join method such as the hash join method. Thus, it is possible to further reduce the amount of data transfer.

Figure 11:
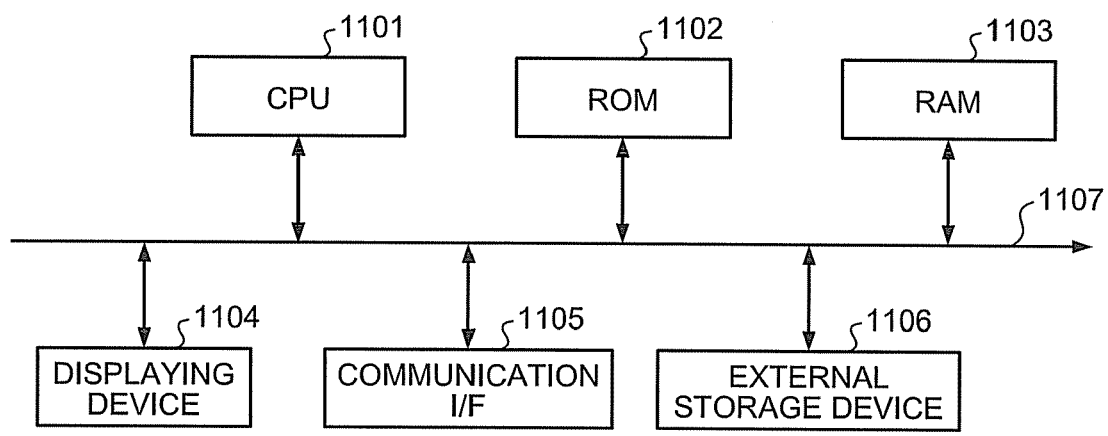
FIG. 11 is a diagram illustrating hardware configurations of the master database processing apparatus, the first database processing apparatus, the second database processing apparatus, and the third database processing apparatus.

As shown in FIG. 11, the master database processing apparatus as well as the first, the second, and the third database processing apparatuses each include, as their hardware configurations, a Read-Only Memory (ROM) 1102 that stores therein a database processing program for performing the database processes described above, a Central Processing Unit (CPU) 1101 that controls the constituent elements of the apparatus according to the program stored in the ROM 1102, a Random Access Memory (RAM) 1103 that stores therein various types of data that are required in the controlling process of the apparatus, a displaying device 1104 that displays the results of the processes described above and the like, a communication interface (I/F) 1105 that connects the apparatus to a network, an external storage device 1106 such as a hard disk, and a bus 1107 that connects these constituent elements to one another. Also, it is possible to apply a commonly-used computer that is configured as described above to any of the apparatuses such as the master database processing apparatus 100, the first database processing apparatus 110, the second database processing apparatus 120, and the third database processing apparatus 130.

The database processing program that is executed by the master database processing apparatus 100, the first database processing apparatus 110, the second database processing apparatus 120, and the third database processing apparatus 130 according to the embodiment described above is provided as being recorded on a computer-readable recording medium such as a Compact Disk Read-Only Memory (CD-ROM), a flexible disk (FD), a Compact Disk Recordable (CD-R), a Digital Versatile Disk (DVD), in a file that is in an installable format or in an executable format.

In this situation, the database processing program is loaded into a main storage device, when being read from the recording medium and executed by each of the apparatuses such as the master database processing apparatus 100, the first database processing apparatus 110, the second database processing apparatus 120, and the third database processing apparatus 130, so that the constituent elements that are explained in the description of the software configuration are generated in the main storage device.

Another arrangement is acceptable in which the database processing program that is executed by the master database processing apparatus 100, the first database processing apparatus 110, the second database processing apparatus 120, and the third database processing apparatus 130 according to the embodiment described above is stored in a computer that is connected to a network such as the Internet and is provided as being downloaded via the network. Yet another arrangement is also acceptable in which the database processing program that is executed by the master database processing apparatus 100, the first database processing apparatus 110, the second database processing apparatus 120, and the third database processing apparatus 130 according to the embodiment described above is provided or distributed via a network such as the Internet.

Yet another arrangement is also acceptable in which an instance processing program according to the present embodiment is provided as being incorporated in a ROM or the like in advance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document searching system comprising:
   a first storing apparatus including a first storage unit that stores first structured documents each having elements that are logically hierarchized;
   a second storing apparatus including a second storage unit that stores second structured documents each having elements that are logically hierarchized, the second structured documents being stored in an exclusive manner with respect to the first structured documents; and
   a document managing apparatus that manages the first storing apparatus and the second storing apparatus, wherein
   the first storing apparatus, the second storing apparatus, and the document managing apparatus are connected via a network, wherein
   the document managing apparatus includes
      a structure storage unit that stores structure information indicating a hierarchical structure that collectively includes hierarchy positional relationships of a first element and a second element in the first and second structured documents stored in the first storage unit and the second storage unit in a collective manner;
      an extracting unit that extracts a first path to the first element in the first structured documents and a second path to the second element in the second structured documents, the first element and the second element having an identical name, when a join search is conducted in the first storage unit and the second storage unit; and
      a transmitting unit that transmits the first path and the second path to the first storing apparatus,
   the first storing apparatus includes
      a first receiving unit that receives the first path and the second path from the document managing apparatus;
      a first searching unit that conducts a search in the first structured documents stored in the first storage unit for one of the first structured documents that contains first text information included in the first element indicated by the first path; and
      a first transmitting unit that transmits to the second storing apparatus, the second path and the first text information contained in the one of the first structured documents found in the search, and the second storing apparatus includes
- a second receiving unit that receives, from the first storing apparatus, the second path and the first text information; and
- a second searching unit that conducts a search in the second structured document stored in the second storage unit for one of the second structured documents that contains second text information included in the second element indicated by the second path, the second text information matching the received text information.

2. The system according to claim 1, wherein
the structure storage unit stores unique information for each of defined elements, the defined elements each being a different one of the elements of which a hierarchy position is defined within the hierarchical structure stored in the structure information, and the unique information indicating whether each defined element is unique,
the extracting unit further extracts the unique information when the unique information of one of the defined elements that corresponds to a hierarchy position of the first element and the second element within the structure information indicates that the one of the defined elements is unique,
the transmitting unit transmits the first path, the second pathat, and the unique information extracted by the extracting unit,
the first receiving unit receives the first path, the second path, and the unique information, and
the first searching unit conducts the search for the one of the first structured documents containing the single first element that is in correspondence with the unique information.

3. The system according to claim 2, wherein unique elements that are contained in the second structured documents stored in the second storing apparatus are larger in quantity than unique elements that are contained in the first structured documents stored in the first storing apparatus.

4. The system according to claim 1, wherein
the document managing apparatus further includes a receiving unit that receives from a user, an instruction serving as a search criterion that a search should be conducted for a set of structured documents in which a predetermined element matches, and
the extracting unit extracts the first path to the first element corresponding to the predetermined element and the second path to the second element corresponding to the predetermined element.

5. The system according to claim 1, wherein
the first transmitting unit transmits the one of the first structured documents found in the search conducted by the first searching unit, to the document managing apparatus,
the second storing apparatus further includes
a second transmitting unit that transmits the one of the second structured documents found in the search conducted by the second searching unit, to the document managing apparatus, and
the document managing apparatus further includes
a receiving unit that receives the one of the first structured documents from the first storing apparatus and the one of the second structured documents from the second storing apparatus; and a generating unit that generates from the received first and second structured documents, a search result showing indicating a set of structured documents containing elements that are identical.

6. A document searching method for conducting a search in a first storing apparatus including a first storage unit storing first structure documents and a second storing apparatus including a second storage unit storing second structured documents each having elements that are logically hierarchized, the second structured documents being stored in an exclusive manner with respect to the first structured documents, the method comprising:

extracting a first path to a first element in the first structured documents and a second path to a second element in the second structured document when a join search is conducted in the first storage unit and the second storage unit, the first element and the second element having an identical name, the first storage unit and the second storage unit storing hierarchy positional relationships of the first element and the second element in the first structured documents and the second structured documents, the hierarchy positional relationships being collectively included in a hierarchical structure indicated as structure information;

transmitting the extracted first path and the second path to the first storing apparatus;

receiving the first path and the second path at the first storing apparatus from the document managing apparatus;

conducting a search in the first structured documents stored in the first storage unit for one of the structured documents that contains first text information included in the first element indicated by the first path;

transmitting to the second storing apparatus, the second path and the first text information contained in the one of the structured documents found in the search;

receiving the second path and the first text information at the second storing apparatus from the first storing apparatus; and conducting a search in the second structured document stored in the second storage unit for one of the structured documents that contains second text information included in the second element indicated by the second path the second text information matching the received text information.

7. The method according to claim 6, wherein
the extracting is to further extract unique information when each of defined elements is a different one of the elements of which a hierarchy position is defined within the hierarchical structure stored in the structure information, and the unique information indicates whether each defined element is unique, and when the unique information that is stored in the structure storage unit and is contained in one of the defined elements corresponding to a hierarchy position of the first element and second element within the structure information indicates that the one of the defined elements is unique,
the transmitting is to transmit the first path, the second path, and the unique information extracted by the extracting unit,
the receiving performed at the first storing apparatus is to receive the first path, the second path and the unique information, and the conducting the search performed by the first storing apparatus is to search for the one of the structured documents containing, the single first element that is in correspondence with the unique information.

8. The method according to claim 7, wherein unique elements that are contained in the second structured documents stored in the second storing apparatus are larger in quantity than unique elements that are contained in the first structured documents stored in the first storing apparatus.

9. The method according to claim 6, further comprising receiving by a document managing apparatus from a user, an instruction serving as a search criterion that a search should be conducted for a set of structured documents in which a predetermined element matches, and the extracting is to extract the first path to the first element corresponding to the predetermined element and the second path to the second element corresponding to the predetermined element.

10. The method according to claim 6, wherein the first storing apparatus transmits the one of the first structured documents found in the search to the document managing apparatus, the second storing apparatus transmits the one of the second structured documents found in the search to the document managing apparatus, and the document managing apparatus receives the one of the first structured documents from the first storing apparatus and the one of the second structured documents from the second storing apparatus; and the document managing apparatus generates from the received first and second structured documents, a search result indicating a set of structured documents containing elements that are identical.

* * * * *